(12) United States Patent
Hindi et al.

(10) Patent No.: US 9,329,965 B2
(45) Date of Patent: May 3, 2016

(54) EXTRACTING LOG FILES FROM STORAGE DEVICES

(71) Applicant: HEWLETT-PACKARD DEVELOPMENT COMPANY, L.P., Houston, TX (US)

(72) Inventors: Faris Hindi, Fremont, CA (US); Leo Volpe, Fremont, CA (US); Chochun Norman Chou, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 149 days.

(21) Appl. No.: 14/170,321

(22) Filed: Jan. 31, 2014

(65) Prior Publication Data

US 2015/0220413 A1 Aug. 6, 2015

(51) Int. Cl.
*G06F 11/00* (2006.01)
*G06F 11/30* (2006.01)
*G06F 11/20* (2006.01)
*G06F 11/14* (2006.01)

(52) U.S. Cl.
CPC ........ *G06F 11/3058* (2013.01); *G06F 11/1471* (2013.01); *G06F 11/2058* (2013.01); *G06F 11/2069* (2013.01); *G06F 11/3034* (2013.01)

(58) Field of Classification Search
CPC .................................................. G06F 11/3034
See application file for complete search history.

(56) References Cited

U.S. PATENT DOCUMENTS

| | | | |
|---|---|---|---|
| 6,098,146 A * | 8/2000 | Bouvier .............. | G06F 11/3034 711/100 |
| 6,405,329 B1 | 6/2002 | Colligan et al. | |
| 6,460,151 B1 * | 10/2002 | Warwick ............... | G06F 11/008 714/57 |
| 7,013,336 B1 * | 3/2006 | King .................... | G06F 11/3034 709/224 |
| 7,743,284 B1 * | 6/2010 | Taylor ................. | G06F 11/0727 714/42 |
| 7,934,131 B1 | 4/2011 | Pinheiro et al. | |
| 8,832,330 B1 * | 9/2014 | Lancaster ........... | H04L 43/0852 710/18 |
| 2002/0010883 A1 * | 1/2002 | Coffey .................. | G06F 11/221 714/712 |
| 2008/0189315 A1 * | 8/2008 | Shih .................... | G06F 11/3089 |
| 2012/0210169 A1 * | 8/2012 | Coile .................. | G06F 11/2092 714/22 |
| 2014/0181585 A1 * | 6/2014 | Hoang ................ | G06F 11/3034 714/26 |
| 2014/0223240 A1 * | 8/2014 | Patil .................... | G06F 11/3034 714/47.1 |

OTHER PUBLICATIONS

Pinheiro, Eduardo et al., "5th USENIX Conference on File and Storage Technologies—Paper", Failure Trends in a Large Disk Drive Population, Jan. 4, 2007, pp. 17-28 of the Proceedings.

* cited by examiner

*Primary Examiner* — Yolanda L Wilson

(74) *Attorney, Agent, or Firm* — Dicke, Billig & Czaja, PLLC

(57) ABSTRACT

A storage system to communicate with a plurality of storage devices. The storage system includes a processor to execute system software that includes machine readable instructions configured to add system-level information regarding the storage system to log files stored in a reserved area of the storage device, extract the log file from each of the storage devices automatically at a predetermined interval, and transmit the log files from the storage system for analysis.

15 Claims, 4 Drawing Sheets

EXTRACTING LOG FILES FROM STORAGE DEVICES

BACKGROUND

A storage system supplier may have thousands of storage systems operating in the field, with many storage drives, including hard disk drives (HDDs) and solid state drives (SSDs), inside each system. The storage drives may contain information or data regarding the drives.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

In one example, storage drives may have two physical areas: a customer area and a reserved area. The customer area is the drive's Logical Block Address (LBA) space used by the host storage system to run the operating system and applications and to store and retrieve data. The reserved area, otherwise known as system area, firmware area, protected area, or negative cylinders, is much smaller in size. It contains various internal drive logs, defect lists, servo information, utilities and diagnostic tools. The reserved area in each drive typically contains logs full of valuable data on drive workload, performance, events, and defects. This information may be extracted and examined to perform a deep assessment, especially to do failure analysis. To illustrate the value of the logs, if a drive fails and is returned to its producer for failure analysis, the first step is typically to extract the logs and analyze them. The log data can often explain the failure so clearly that no further failure analysis is typically performed. Thus, the logs and their analysis provide a wealth of information about failed drives.

Figure 1:
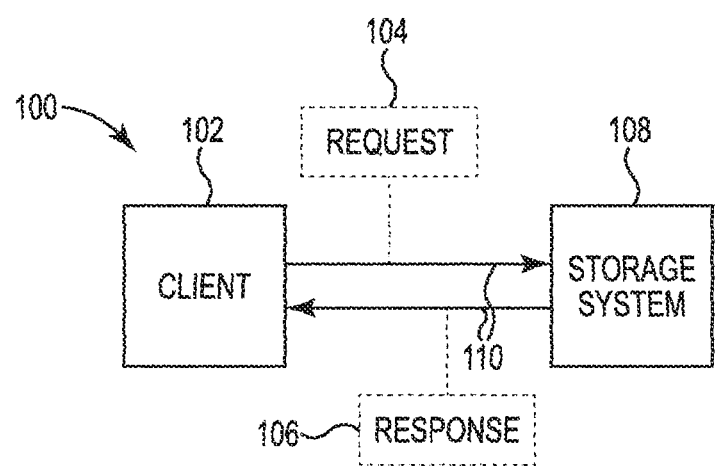
FIG. 1 is a block diagram illustrating a storage system environment according to one example.

Most storage drives do not fail, and their log data sits inside the drives and goes unutilized. Existing drive logs are designed for failure analysis on a single drive but are ill-suited for telemetry. The log files may be too large, and some data is stored from time zero, and other data are wrapped based on volume. The log files may be drive producer-unique and not readily accessible with standard commands. Many drive logs are retrieved with non-standard, supplier-specific commands. In addition, missing from the drive logs may be valuable information about time and date and about the host storage system. FIG. 1 is a block diagram illustrating a storage system environment 100 according to one example. The environment 100 includes a client 102 and a storage system 108, which are communicatively coupled together via a communication link 110. The communication link 110 according to one example comprises a Storage Area Network (SAN) including Fiber Channel (FC) or Serial Attached Small Computer System Interface (Serial Attached SCSI or SAS). In another example, the communication link 110 comprises a network that may comprise point-to-point links, local area networks (LANs), and wide area networks (WANs). The storage system 108 according to one example is a computer with an operating system, and provides file service relating to the organization of information on a set of storage devices or drives. In operation, the client 102 may send the storage system 108 a request 104 to access specific data (such as a specific file or directory) stored on the storage devices of storage system 108. The storage system 108 receives and processes the request 104 and transmits a response 106, including the requested data, to the client 102 over the communication link 110.

Figure 2:
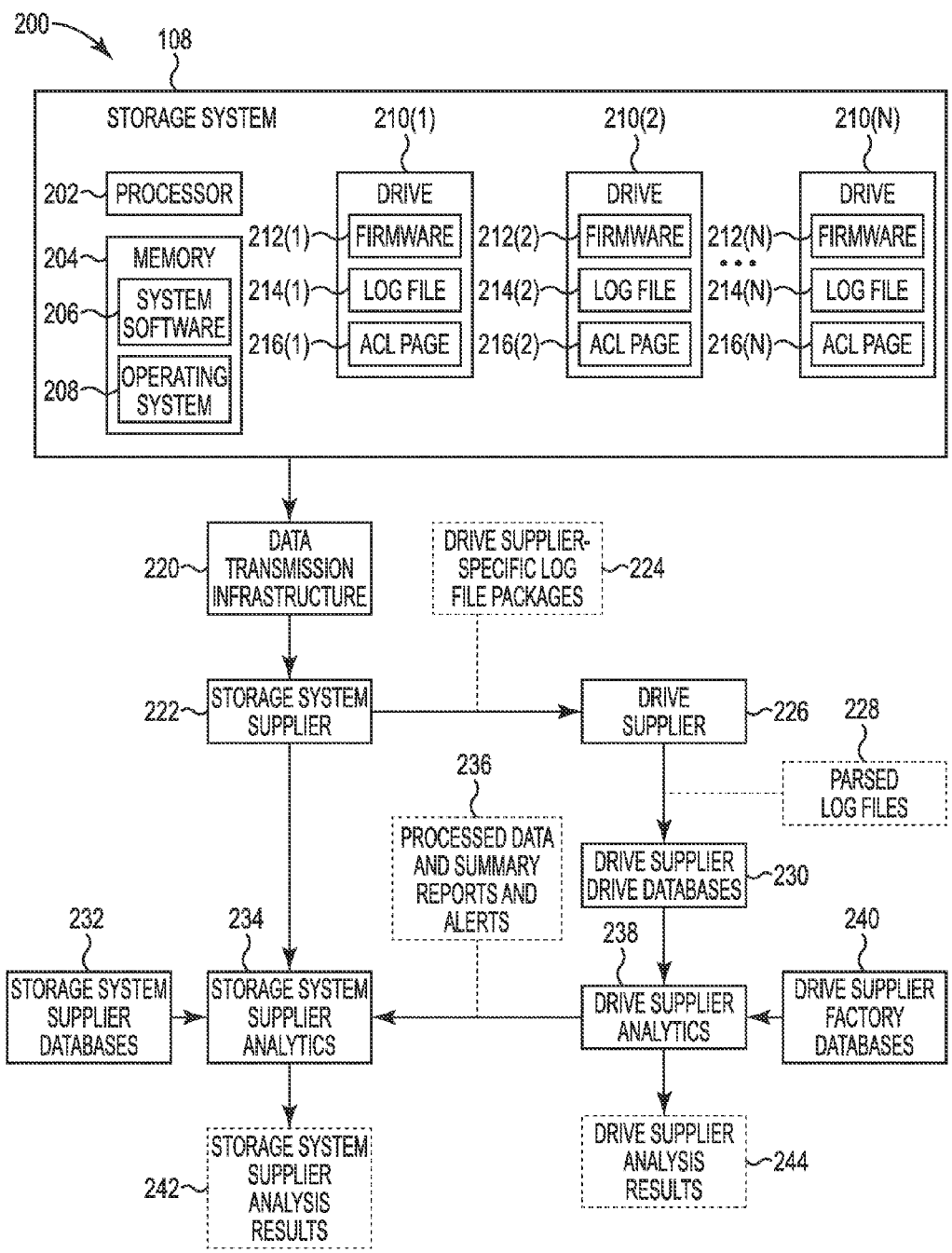
FIG. 2 is a block diagram illustrating an automated drive log collection and analysis system according to one example.

FIG. 2 is a block diagram illustrating an automated drive log collection and analysis system 200 according to one example. System 200 includes storage system 108, data transmission infrastructure 220, storage system supplier 222, drive suppliers 226, drive supplier drive databases 230, storage system supplier databases 232, storage system supplier analytics 234, drive supplier analytics 238, and drive supplier factory databases 240. Storage system 108 includes processor 202, memory 204, and a plurality of storage devices or storage drives 210(1)-210(N) (collectively referred to as drives 210). System software 206 and operating system (OS) 208 are stored in memory 204, and are executed by processor 202.

Drives 210 include hard disk drives (HDDs) and solid state drives (SSDs) from a variety of different drive suppliers. Drives 210(1)-210(N) include firmware 212(1)-212(N), respectively, log files 214(1)-214(N), respectively, and application client log (ACL) pages 216(1)-216(N). Firmware 212(1)-212(N) are collectively referred to as firmware 212. Log files 214(1)-214(N) are collectively referred to as log files 214. ACL pages 216(1)-216(N) are collectively referred to as ACL pages 216. Log files 214 and ACL pages 216 are stored in a reserved area of the drives 210. System software 206 and firmware 212 comprise machine readable instructions.

Depending on the exact configuration and type of storage system 108, memory 204 may be volatile (such as RAM), non-volatile (such as ROM, flash memory, etc.), or some combination of the two. System 108 may also have additional or different features/functionality and additional or different hardware and software. For example, system 108 may also include additional storage (removable and/or non-removable) including, but not limited to, magnetic or optical disks or tape. Computer storage media includes volatile and nonvolatile, removable and non-removable media implemented in any suitable method or technology for non-transitory storage of information such as computer readable instructions, data structures, program modules or other data. Memory 204 is an example of computer storage media (e.g., computer-readable storage media storing computer-executable instructions that when executed by at least one processor cause the at least one processor to perform a method). Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices. Any such computer storage media may be part of storage system 108.

System 200 is configured to perform automated drive log collection (ADLC), which involves harvesting log files 214 from drives 210 inside storage systems 108 operating in the field, and analyzing the log files 214 to gain new knowledge and insights toward better storage products. The log files 214 contain a wealth of information on drive workload, performance, events, defects, and environment. In one example, each log file 214 includes information regarding Self-Monitoring Analysis and Reporting Technology (SMART), usage, errors, grown defects (G-list), performance, temperature, voltage on 5V and 12V lines, vibration sensor data (RV/LV), humidity sensor data, random vs. sequential reads, random vs. sequential writes, seek length distribution, read vs. write error count, failure mode/error type data, recovered vs. unrecovered errors, depth of error recovery, background media scan refresh rate, grown defect refresh rate, and head-disk clearance shift. In one example, each of the log files 214 has a maximum size of 3 MB.

Storage system 108 is configured to automatically synchronize actual date and time with power-on hours (POH) in the drives 210, and log updates regarding the host storage system 108 in the log files 214. The host storage system 108 records and updates the time and date and host system information in the log files 214. The information about time and date enables a log analyst to view drive use history and changes as a function of timeframe. Information about the host system 108 according to one example includes the following: Date and time stamp; host storage system 108 part number and serial number; host operating system 208 version and software revision; enclosure number, model/type, firmware, and drive location within it; HBA firmware; and the state of the system 108. Adding the host system data to the drive log files 214 enables an analyst to connect the behavior of the drives 210 with their system environment 108, which enables a more informed failure analysis and broadens perspectives on drive performance and reliability.

By maintaining the actual time in the log files 214, rather than just power-on hours, a log analyst can more easily identify which of a number of possible events triggered a problem with a drive 210. Since the drives 210 may not be powered on all the time, and power-off time is not readily tracked, such an identification may not always be possible based solely on the power-on hours information. In addition, if drives in a system fail, the drives may be removed out quickly, without making a record of their location within the system. Although such location data might possibly be reconstructed eventually, such a reconstruction may involve considerable time and effort. These issues may be avoided by system 108, which synchronizes the time stamp with power-on hours and logs system location and other information to the log files 214.

The system-level information that is stored in the log files 214 could alternatively be recorded elsewhere in the system 108, such as the customer area on the same drive 210, or any other storage device in the system 108, or any offline storage. The system 108 could then pull power-on hour information from the log files 214 and synch it up with the actual time from the host storage system 108. Information logged in the log files 214 could be combined and analyzed together with system information logged elsewhere by the host system 108. However, having to combine information stored in two different locations (e.g., in the log files 214 and some other place in the system 108), is more difficult, inconvenient, and unreliable than storing all of this information in the log files 214.

System software 206 adds the system-level information (for storage system 108) to the log files 214. In one example, the system-level information is first written to the ACL pages 216. The addition of the system-level information is event-driven and infrequent. The firmware 212 accepts the system-level ACL information and adds it to the logs 214.

The specific example of logging system information to the log files 214 may vary based on the drive-host interface type. If the interface is SCSI-based, such as Serial Attached SCSI (SAS), one example uses the ACL pages 216 to record the system data. Other examples may use other mechanisms for storage of the system-level information.

Since the host storage system 108 can evolve during the life of a drive 210, the system information stored in the ACL pages 216 is updated whenever a significant change to the host system 108 occurs. Examples of such changes include: (1) Admitting a drive 210 to the system 108; (2) Servicing a drive enclosure for a drive 210; (3) Occurrence of a new drive state for a drive 210, as perceived by the host system 108; (4) Host firmware update for system 108; (5) Drive firmware update for drives 210; and (6) Host operating system upgrade for system 108. Thus, updates to the time stamp and host system information stored in the ACL pages 216 is event-triggered, and the events listed above trigger an automatic entry to the ACL page 216. Synchronization of the drive's power-on hours (POH) with real time and date is done by the drive firmware 212. Each ACL entry is associated with a certain POH. Each time an ACL entry is written, the POH is updated for that entry.

ADLC is enabled by firmware 212 in the drives 210, and the system software 206 of the storage system 108. The system software 206 includes machine readable instructions configured to extract log files 214 from the drives 210 automatically at predetermined intervals. In one example, the interval is one log file 214 extract per four weeks per drive 210. Firmware 212 includes machine readable instructions configured to yield log files 214 containing the data of interest over a four-week time interval. The log files 214 are incremental in time, and are concatenated by drive suppliers 226 during post-processing. Firmware 212 enables the system software 206 to extract log files 214 using a common specification, as opposed to the non-standard, drive supplier-specific commands typically used to access log files.

System software 206 is configured to periodically extract log files 214 from drives 210 of various configurations from various suppliers in a certain sequence, without affecting performance. In one example, system software 206 fetches the log files 214 from the drives 210 via a Crash Dump through Read Buffer mechanism, which is enabled by the firmware 212. System software 206 issues log rextract commands to all drives 210 in the system 108 in a round-robin fashion.

A robust data transmission infrastructure 220 is used to support and route the log traffic. System software 206 zips up the log files 214, organizes the log files 214 by drive supplier, creates TAR archives of the log files 214, and transmits the log files 214 to storage system supplier 222 via infrastructure 220. In one example, the infrastructure 220 sends data via Service Processor (SP), and transmits the system-level data, in addition to the drive-level log file information, to storage system supplier 222. Storage system supplier 222 pushes the log files 214 to drive suppliers 226 (e.g., to sFTP sites of the drive suppliers 226) via drive supplier-specific log file packages 224. The drive suppliers 226 receive, parse, and process the log files 214. The parsed log files 228 are stored in drive supplier drive databases 230. Storage system supplier 222 also provides log file information and the system-level data to storage system supplier analytics 234.

The log files 214 are analyzed both by the storage system supplier analytics 234 and the drive supplier analytics 238. Analysis of the log files 214 helps these suppliers to gain a better understanding of drive utilization, to form new perspectives on drive performance and reliability, and to investigate issues. The parsed log files 228 are connected with data in drive supplier factory databases 240, and analyzed by drive supplier analytics 238. The databases 240 include manufacturing data for the drives 210 and their constituent components. The drive supplier analytics 238 return processed data, summary reports, and alerts 236 to storage system supplier analytics 234, and generate drive supplier analysis results 244. Storage system supplier analytics 234 analyze the received data 236 in combination with received system-level data and other data in storage system supplier databases 232, and generate storage system supplier analysis results 242.

As mentioned above, in one example, the system-level information is first written to the ACL pages 216. Time and date information is recorded as part of the ACL page contents by the system software 206. Any issuance of a log select command to the ACL page 216 of a drive 210 is recorded by the drive 210 in the log file 214. With these two arrangements, the system 200 can correlate the real date and time with Power-On-Hour (POH) references used in the log file 214. In one example, the host system 108 performs one write to a drive 210 for each update to its ACL page 216, instead of a read-modified-write plus other operations. The design shifts the computing power for maintaining a circular buffer structure on the ACL page 216 from the storage system 108 to each of the drives 210. The firmware 212 in each drive 210 maintains the circular buffer. This saving happens at the time of each update to an ACL page 216.

Each ACL page 216 contains a list of parameters. Each parameter is 100h (256) bytes fixed length, and contains FCh (252) bytes of data and 4 bytes of header. Parameter 0000h of the ACL page 216 is reserved for storing the current parameter pointer. Parameters 1000h to FFFFh are reserved. Parameters 1000h to 103Fh are used as wild card parameters for the application client to write to the ACL page 217 starting with parameter 1000h.

Parameters 0001h to 003Fh are maintained as a circular buffer, and store application client data in ASCII. These parameters are written by the application client through using either the wild card parameter 1000h or the standard SCSI log select command within the range from 0001h to 003Fh. Although standard SCSI access to these parameters is possible, they are primarily designed to assist the application client for dumping system information to the ACL page 216 through using parameter 1000h as the starting parameter in the log select command. When the application client issues a log select command starting with parameter 1000h, parameter 1000h and all subsequent parameters in the log select command will be written to the ACL page 216 starting from the parameter pointed by the current parameter pointer in parameter 0+1. The current parameter will be updated in the parameter 0 after the update to the ACL page 216 is completed. Once all parameters from 0001h to 003Fh are used, the drive will wrap around the ACL page 216 from parameter 0001h again.

Figure 3:
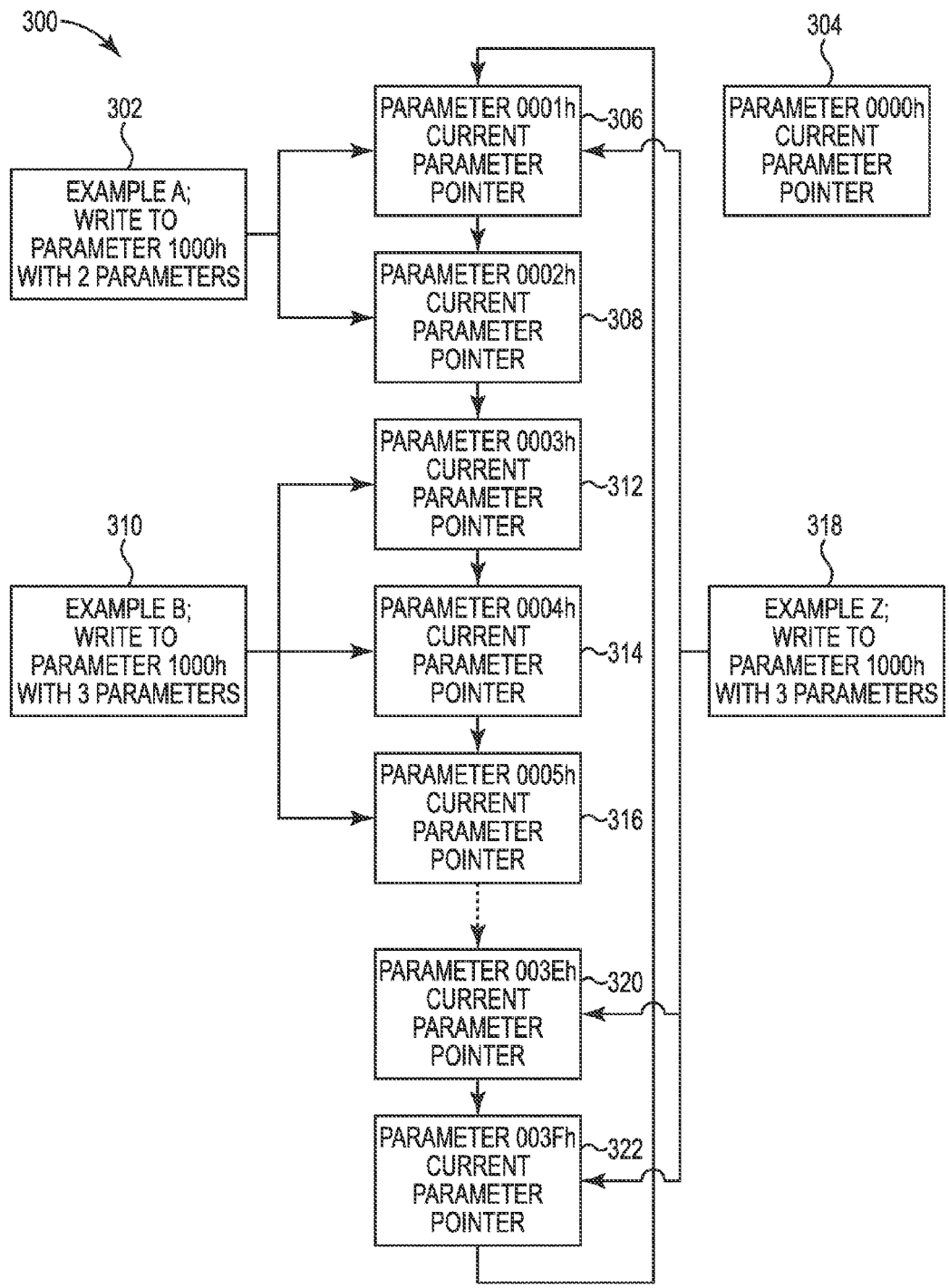
FIG. 3 is a flow diagram illustrating application client log (ACL) parameters maintained as a circular buffer according to one example.

FIG. 3 is a flow diagram illustrating ACL parameters 0001h to 003Fh maintained as a circular buffer 300 according to one example. Parameter 0000h of the ACL page 216, which is represented by block 304 in FIG. 3, is reserved for storing the current parameter pointer. At 302 (Example A), a write to parameter 1000h is performed with two parameters. The first of the two parameters is stored at 306 as parameter 0001h. The second of the two parameters is stored at 308 as parameter 0002h. At 310 (Example B), a write to parameter 1000h is performed with three parameters. The first of the three parameters is stored at 312 as parameter 0003h. The second of the three parameters is stored at 314 as parameter 0004h. The third of the three parameters is stored at 316 as parameter 0005h. Additional writes may then be performed as represented by the dashed lines between blocks 316 and 320. At 318 (Example Z), a write to parameter 1000h is performed with 3 parameters. The first of the three parameters is stored at 320 as parameter 003Eh. The second of the three parameters is stored at 322 as parameter 003Fh, which represents the end of the circular buffer 300. The third of the three parameters is stored at 306 (i.e., the beginning of the circular buffer 200) as parameter 0001h.

In one example, a constant wild card pointer (1001h) is used by the system software 206 to access the ACL pages 216 so that the drive firmware 212 can manage the circular buffer 300. System software 206 according to one example only writes to parameters starting from 1001h and extending to some where no more than 103Fh. Parameters addressed by system software 206 from 1001h to 103Fh do not really exist, but rather are parameter pointers so that system software 206 can specify where the data will be written to. The system software 206 does not need to know where the current parameter pointer is, and whether it needs to wrap around the ACL page 216 to the top if the end of the ACL page 216 is reached. The drive firmware 212 handles these details. The ACL pages 216 have a finite size, which in one example is 40h parameters, from parameter 0000h to parameter 003Fh.

In one example, the drive firmware 212 maps the 1001h wild card pointer to the actual current parameter pointer stored in the parameter 0000h, and writes with the parameters supplied by the system software 206 ranging from 1001h to somewhere not exceeding 103Fh to the parameters starting from the parameter pointed by the current pointer and ending with the last parameter so that the total number of parameters written matches the number of parameters written by the system software 206. The drive firmware 212 updates the current pointer in parameter 0000h after the write is completed. This is how the circular buffer 300 is maintained by the drive firmware 212.

Thus, the system software 206 only needs to know the wild card pointer, which is a constant, and there is no need for the system software 206 to perform calculations or use a look-up table for writing to the ACL pages 216. The drive firmware 212 calculates the actual buffer locations to write (with the data specified by the system software 206) by mapping the wild card pointer to the current pointer stored in parameter 0000h, which is the starting write location. The drive firmware 212 updates the current pointer stored in the parameter 0 after all the parameters are updated. In this manner, the computation for the system software 206 is shifted to the drive firmware 212. This is beneficial because there may be a limited number of CPUs in storage system 108, while there may be several hundreds of drives 210 with at least one CPU per drive.

One example is directed to a storage system that includes a plurality of storage devices. Each of the storage devices includes firmware, and a log file stored in a reserved area of the storage device. The storage system includes system software, and a processor to execute the system software. The system software adds system-level information regarding the storage system to the log files, extracts the log file from each of the storage devices automatically at a predetermined interval, and transmits the log files from the storage system for analysis.

In one form of the storage system, the log files are incremental in time, and are concatenated during the analysis. The firmware in each of the storage devices enables the system software to extract the log files using a common specification rather than drive-specific commands. The storage devices according to one example comprise at least one of hard disk drives (HDDs) and solid state drives (SSDs).

In one example, each of the log files includes information regarding at least two of the following: Self-Monitoring Analysis and Reporting Technology (SMART), usage, errors, performance, temperature, voltage, vibration sensor data, and humidity sensor data. The system-level information includes at least two of the following: Date and time stamp; part number of the storage system; serial number of the storage system; version of an operating system of the storage system; storage device location within the storage system; and a state of the storage system.

The system software according to one example writes the system-level information to an application client log (ACL) page of each of the storage devices based on the occurrence of any of a predetermined set of events. In one form of this example, the firmware in each of the storage devices accepts the system-level information and adds it to the log file for the storage device. The system-level information in the ACL page of each of the storage devices is updated whenever a significant change to the storage system occurs. A significant change to the storage system includes at least one of: admitting a storage device to the storage system; servicing a drive enclosure for a storage device in the storage system; occurrence of a new drive state for a storage device in the storage system, as perceived by the storage system; firmware update for the storage system; firmware update for storages devices in the storage system; and operating system upgrade for the storage system.

Entries in the ACL page of each of the storage devices each include a real time and date, and each of the entries is associated with a certain power-on hours (POH), and each time a new entry is added to one of the ACL pages, an updated POH is associated with the new entry. In one example, each of the ACL pages includes a circular buffer structure maintained by the firmware of the storage devices, and the system software writes the system-level information to the circular buffer structure of the ACL page.

The system software organizes the log files extracted from the storage devices by supplier of the storage devices, and transmits the organized log files to a supplier of the storage system.

Another example is directed to a storage system that includes a plurality of storage drives. Each of the storage drives includes firmware, and a log file that is incremental in time stored in a reserved area of the storage drive. The storage system includes system software, and a processor to execute the system software. The system software adds system-level information regarding the storage system, including a date and time stamp, to the log files, extracts the log file from each of the storage drives automatically at a predetermined interval, and transmits the log files from the storage system for analysis.

Figure 4:
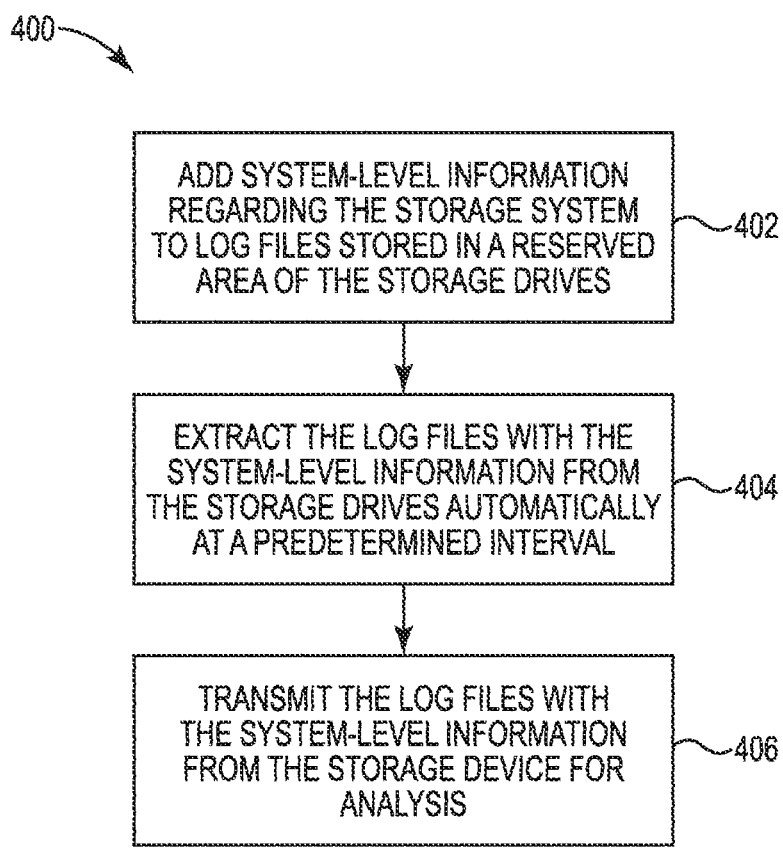
FIG. 4 is a flow diagram illustrating a method of obtaining information from a storage system having a plurality of storage drives according to one example.

Yet another example is directed to a method of obtaining information from a storage system. FIG. 4 is a flow diagram illustrating a method 400 of obtaining information from a storage system having a plurality of storage drives according to one example. Storage system 108 is configured to perform method 400. At 402 in method 400, system-level information regarding the storage system is added to log files stored in a reserved area of the storage drives. At 404, the log files with the system-level information are extracted from the storage drives automatically at a predetermined interval. At 406, the log files with the system-level information are transmitted from the storage system for analysis.

Extraction and analysis of logs from drives is typically done in the case of issues or problems with the drives. Some automated log collection methods are event-triggered (e.g., a log is extracted if and when a drive posts an error or when some other predetermined event is encountered), or the logs are very limited in the types of information that are retrieved (e.g., SMART data). While the SMART log is valuable, its content is limited. Drive logs other than SMART have typically been retrieved with non-standard, supplier-specific commands, and retrieval of such logs has typically been done by taking the drive out of system and using supplier-specific tools at the bench. Regular drive logs are designed for failure analysis on a single drive but are ill-suited for telemetry. The log files are too large, and some data is stored from time zero, and other data are wrapped.

In contrast to other methods, examples disclosed herein harvest log data from all HDDs and SSDs in the field to gain knowledge about the entire population, and the retrieved data includes much more information than previous methods. The drive firmware and system software enable the host storage system to extract logs using a common specification. The vast majority of drives does not fail and does not have frequent errors or other obvious issues. Examples disclosed herein look at log data from all drives, both passing and failing, both with and without errors, both eventful and uneventful. The drive firmware yields selected log data in suitable time increments. Some examples include recording and updating of host system information in the drive's reserved area. The drive digests this host information and injects it into every log file that is harvested. Adding this host system information to ADLC data enable the analysts to connect the drive's behavior with its system environment. The date-and-time information that is added to the log files is also useful because the drive does not keep time; it just knows its power-on hours. In one example, the system synchronizes the drive's power-on hours with a real clock time.

Examples disclosed herein provide numerous benefits, such as the following: (1) Providing a better understanding of drive field utilization (e.g., workloads and duty cycles; performance trends vs. service time; technology trends across large populations; differences by system type, by customer, by supplier, and by drive model); (2) Providing new perspectives on performance and reliability (e.g., trends as function of workload and duty cycle; effects of storage system environment, system type, and drive location/position in storage system; relation between drive reliability tests and drive utilization; opportunities to improve SMART); and (3) Investigation of issues (e.g., precursors to failures; quality differences as a function of drive components and factory history; trends as a function of drive and system environment and utilization). Examples disclosed herein can be used to provide new insights leading to improved designs of storage products and to better informed business decisions.

The system 108 may be any electronic device capable of data processing. For example, system 108 may include processors or computers with memory or storage technology to store computer or processor executable instructions to implement the techniques of the present application. The system 108 may be configured to manage communication with storage devices. In one example, system 108 may include components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. The system 108 may also comprise a network interface to communicate with other computers over a network. The system 108 may contain a processor which may be any number of well known processors. In another example, the processor may be an application specific integrated circuit ("ASIC"). The system 108 may include storage which may include non-transitory computer readable medium ("CRM") to store instructions that may be retrieved and executed by the processor. The non-transitory CRM may be used by or in connection with any instruction execution system that may fetch or obtain the logic from non-transitory CRM and execute the instructions contained therein.

The non-transitory computer readable media (CRM) may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM may be a random access memory ("RAM") device or may be divided into multiple memory segments organized as dual in-line memory modules ("DIMMs"). The non-transitory CRM may also include any combination of one or more of the foregoing and/or other devices as well.

The instructions residing in the non-transitory CRM may comprise any set of instructions to be executed directly (such as machine code) or indirectly (such as scripts) by the processor. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Although specific examples have been illustrated and described herein, a variety of alternate and/or equivalent examples may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A storage system comprising: a processor to execute system software that includes machine readable instructions configured to add system-level information regarding the storage system, including a date and time in a standardized format, to log files stored in a reserved user inaccessible area of storage device based on the occurrence of at least one predetermined event affecting at least one of the storage devices, synchronize the date and time of the predetermined event with a certain power-on hours (POH) of the storage device, extract the log file from each of the storage devices automatically at a predetermined interval, and transmit the log files from the storage system for analysis.

2. The storage system of claim 1, wherein the log files are incremental in time, and are concatenated during the analysis.

3. The storage system of claim 1, wherein firmware includes machine readable instructions configured in each of the storage devices when executed to enable the system software to extract the log files using a common specification rather than drive-specific commands.

4. The storage system of claim 1, wherein the storage devices comprise at least one of hard disk drives (HDDs) and solid state drives (SSDs).

5. The storage system of claim 1, wherein each of the log files includes information regarding at least two of the following: Self-Monitoring Analysis and Reporting Technology (SMART), usage, errors, performance, temperature, voltage, vibration sensor data, and humidity sensor data.

6. The storage system of claim 1, wherein the system-level information includes at least two of the following: Date and time stamp; part number of the storage system; serial number of the storage system; version of an operating system of the storage system; storage device location within the storage system; and a state of the storage system.

7. The storage system of claim 1, wherein system software includes machine readable instructions configured to write the system-level information to an application client log (ACL) page of each of the storage devices.

8. The storage system of claim 7, wherein the firmware includes machine readable instructions configured in each of the storage devices configured to accept the system-level information and adds it to the log file for the storage device.

9. The storage system of claim 7, wherein the system-level information in the ACL page of each of the storage devices to be updated whenever a significant change to the storage system occurs.

10. The storage system of claim 9, wherein a significant change to the storage system includes at least one of: admitting a storage device to the storage system; servicing a drive enclosure for a storage device in the storage system; occurrence of a new drive state for a storage device in the storage system, as perceived by the storage system; firmware update for the storage system; firmware update for storages devices in the storage system; and operating system upgrade for the storage system.

11. The storage system of claim 7, wherein each time a new entry is added to one of the ACL pages, an updated POH is associated with the new entry.

12. The storage system of claim 7, wherein each of the ACL pages includes a circular buffer structure maintained by the firmware of the storage devices, and wherein the system software includes machine readable instructions configured to write the system-level information to the circular buffer structure of the ACL page.

13. The storage system of claim 1, wherein the system software includes machine readable instructions configured to organize the log files extracted from the storage devices by supplier of the storage devices, and transmit the organized log files to a supplier of the storage system.

14. A method of obtaining information from a storage system, the method comprising:
adding system-level information regarding the storage system, including a date and time in a standardized format, to a log file stored in a reserved user inaccessible area of a storage drive, based on the occurrence of at least one predetermined event affecting the storage drive;
synchronizing the date and time of the predetermined event with a certain power-on hours (POH) of the storage drive;
extracting the log file with the system-level information from the storage drive automatically at a predetermined interval; and
transmitting the log file with the system-level information from the storage system for analysis.

15. A non-transitory computer-readable medium having a set of machine readable instructions that, when executed, cause a storage system to:

add system-level information regarding the storage system, including a date and time stamp, to a log file stored in a reserved user inaccessible area of a storage drive based on the occurrence of at least one predetermined event affecting the storage drive;
synchronize the date and time stamp of the predetermined event with a certain power-on hours (POH) of the storage drive;
extract the log file from the storage drive automatically at a predetermined interval; and
transmit the log file from the storage system for analysis.

* * * * *